United States Patent [19]

Schucker

[11] Patent Number: 4,998,502
[45] Date of Patent: Mar. 12, 1991

[54] APPARATUS FOR TEMPERING FLUID MASSES

[76] Inventor: Josef Schucker, Straatsangehörigkeit, D-7530 Pforzheim, Fed. Rep. of Germany

[21] Appl. No.: 328,160
[22] PCT Filed: Jul. 17, 1987
[86] PCT No.: PCT/EP87/00388
  § 371 Date: Jan. 23, 1989
  § 102(e) Date: Jan. 23, 1989
[87] PCT Pub. No.: WO88/00675
  PCT Pub. Date: Jan. 28, 1988

[30] Foreign Application Priority Data

Jul. 23, 1986 [DE] Fed. Rep. of Germany ....... 3624844

[51] Int. Cl.$^5$ .............................................. B05C 11/10
[52] U.S. Cl. ..................... 118/667; 118/302; 118/600; 118/688; 165/109.1; 165/912; 222/54; 222/146.1
[58] Field of Search ............... 118/667, 688, 713, 302, 118/600, 693; 165/137, 109.1, 912; 62/3.2, 3.4; 239/128, 135, 139; 222/54, 146.1

[56] References Cited

U.S. PATENT DOCUMENTS

| | | | |
|---|---|---|---|
| 1,737,347 | 11/1929 | Wilson | 165/137 |
| 2,817,600 | 12/1957 | Yahnke | 118/302 X |
| 3,470,702 | 10/1969 | Koch et al. | 62/3.4 |
| 3,477,870 | 11/1969 | Boretti et al. | 118/302 X |
| 3,554,107 | 1/1971 | McCarthy et al. | 118/667 X |
| 3,590,775 | 7/1971 | Barr | 118/667 |
| 4,026,237 | 5/1977 | Flanagan | 118/667 X |
| 4,330,354 | 5/1982 | Deubner et al. | 118/688 X |
| 4,493,286 | 1/1985 | Carson | 118/688 X |
| 4,494,380 | 1/1985 | Cross | 62/3.2 |
| 4,627,989 | 12/1986 | Feverstein et al. | 118/667 X |

FOREIGN PATENT DOCUMENTS

| | | |
|---|---|---|
| 17082 | 3/1980 | European Pat. Off. . |
| 214109 | 3/1987 | European Pat. Off. . |
| 86622 | 6/1895 | Fed. Rep. of Germany . |
| 1231730 | 1/1967 | Fed. Rep. of Germany . |
| 7824587 | 11/1978 | Fed. Rep. of Germany . |
| 2827181 | 1/1979 | Fed. Rep. of Germany . |
| 8222391 | 12/1982 | Fed. Rep. of Germany . |
| 3142262 | 5/1983 | Fed. Rep. of Germany . |
| 3314159 | 11/1983 | Fed. Rep. of Germany . |
| 8332914 | 2/1984 | Fed. Rep. of Germany . |
| 1331710 | 5/1963 | France . |
| 1443181 | 5/1966 | France . |
| 1541999 | 9/1968 | France . |
| 1548442 | 12/1968 | France . |
| 506759 | 6/1971 | Switzerland . |

Primary Examiner—Richard L. Chiesa
Attorney, Agent, or Firm—Horst M. Kasper

[57] ABSTRACT

An apparatus for tempering fluid glues in continuous operation has a heat transfer body made of a cuboid aluminum block (26) in which is integrated the glue channel (24, 25), and the broad-side surfaces of which are thermally linked to Peltier elements (28) for heating and cooling the glue to be tempered. The Peltier elements (28) are provided on their heat transfer surfaces opposite to the aluminum block (26) with heat conductive ribs (30) that can be charged with a flow of cooling and/or heating air through an air channel (44). Inside the glue channel (24, 25) are arranged baffle plates or ribs as static mixers (36) that ensure a thorough mixing and an even temperature within the flow of glue.

30 Claims, 5 Drawing Sheets

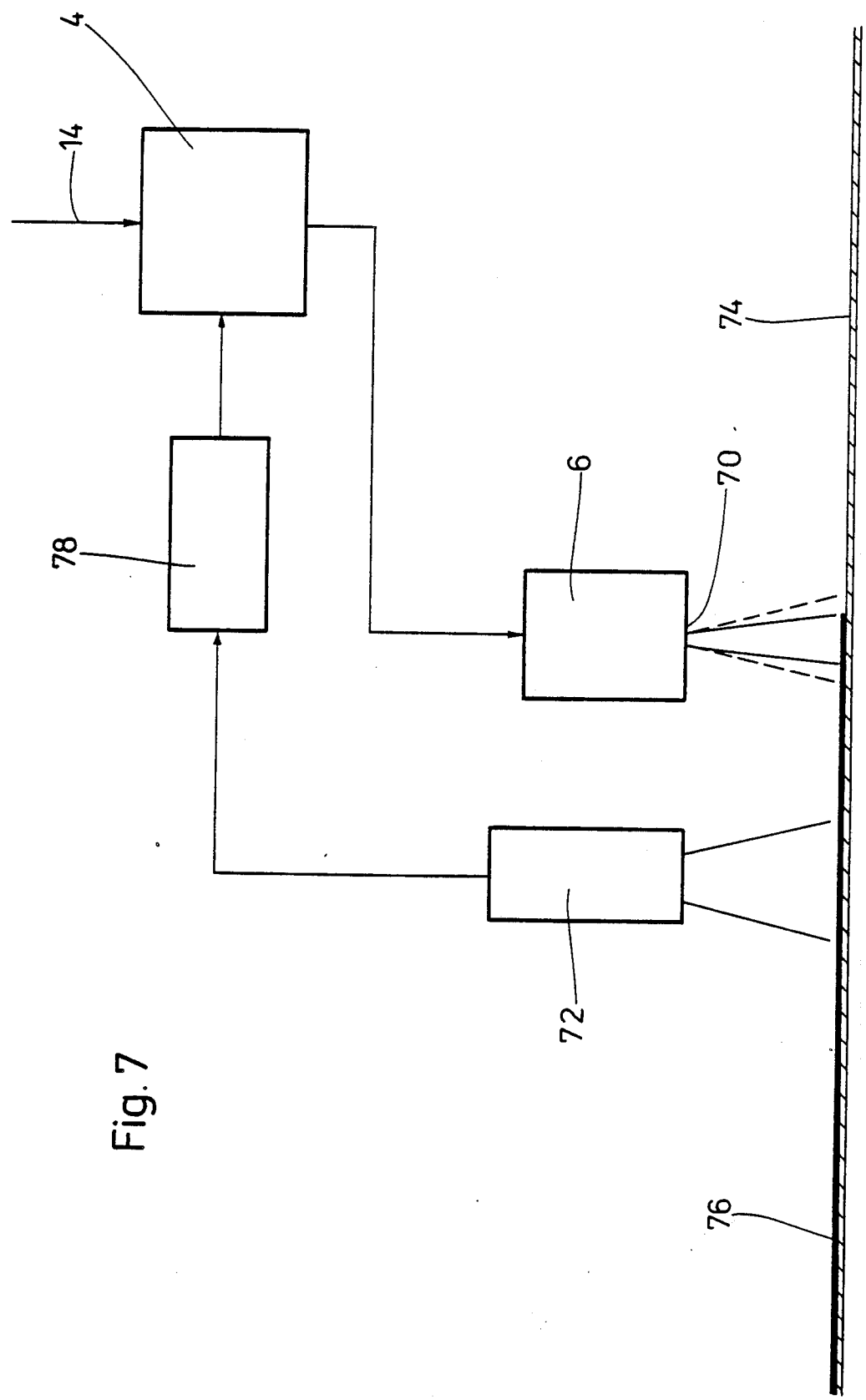

4,998,502

APPARATUS FOR TEMPERING FLUID MASSES

BACKGROUND OF THE INVENTION

1. Field of the Invention

The invention relates to a tempering apparatus for fluids with a heat-exchange body of high thermal conductivity exhibiting a cuboid-shaped solid body, where at least one of the broad-side faces of the heat-exchange body is thermally connected with Peltier elements, and with boreholes disposed in the heat-exchange body, which boreholes are connected to a meander-shape flow channel with an input opening and a discharge opening.

2. Brief Description of the Background of the Invention Including Prior Art

In an apparatus of this kind, which is intended for the automatic control of the humidity in a climate chamber, it is known from Patent Application No. FR-A-1,548,442 to provide a cuboid-shaped solid body chamber, furnished with flow channels for a flow medium, respectively in a gas feed line for the climate chamber and in a bypass, where one of the broad-side faces of the solid body chamber is furnished with Peltier elements. The known solid body chamber is a separator for liquid, which is fed with water-saturated air as a flow medium. The flow path comprises, in this case, a large-volume flow-through space, a liquid-collector space, and a zigzag-shaped running part. The flow-through space is connected with its input opening to a gas line and extends vertically downward up to the lower disposed liquid-collector container, where the liquid-collector container is furnished with a discharge screw for condensation water. The gas is led from the liquid-collector container via the zig-zag-shaped running part of the flow path to the discharge opening. The zig-zag-shaped running part is milled into a metal block and rests on a metal plate at the cold side of the Peltier elements. The metal block simultaneously forms a part of the delimiting wall of the flow-through space. The remaining part of the delimiting wall of the flow-through space is produced of plastic with a low thermal conductivity. Cooling fins are set onto the hot side of the Peltier elements, which cooling fins are cooled with a blower. The known flow-through cooler serves exclusively for cooling of gases, however, not of viscous flow masses such as glues, sealing materials, and varnishes: The large-volume flow-through space and the liquid chamber are passed through much slower than the zigzag-shaped running part of the flow path. No sufficient mixing of the mass flow occurs in the large-volume parts. Since the mass flow in the large-volume regions is cooled only from one side via a metallic intermediate wall and, however, since there occurs no heat exchange on the other side at the delimiting wall formed of plastic material, there would be generated, in case of a viscous mass, a large temperature gradient crosswise to the flow direction, with the consequence of a corresponding viscosity drop crosswise to the flow direction, which would necessarily result in a marked flow profile within the respective channel parts and in a plugging or clogging. It has to be added that, in the known liquid separator, the Peltier elements are employed exclusively as cooling aggregates.

SUMMARY OF THE INVENTION

1. Purposes of the Invention

It is an object of the invention to develop a tempering apparatus of the initially recited kind, which is suitable for the tempering of viscous masses and which can be employed in particular in varnishing robots and gluing robots.

These and other objects and advantages of the present invention will become evident from the description which follows.

2. Brief Description of the Invention

In a feeding of a tempering apparatus with viscous masses, such as glues, sealing material, and varnishes, as a fluid, the deflection in the meander-shaped flow channel takes care of an intensive mixing and thus of a temperature balancing in the mass flow. A combined heating and cooling aggregate is available with Peltier elements according to the invention, where as required or as desired, a temperature increase or a temperature decrease becomes possible. In order to influence directly or indirectly the viscosity determining the flow and spray behavior of the exiting mass flow, there is provided, according to the invention, a sensor for measuring the viscosity of the mass flow exiting from the tempering apparatus or of a parameter influencing the viscosity or of a parameter depending on the viscosity, as well as one automatic controller, fed with the respective measurement value, for controlling the Peltier elements according to the size of the deviation from a predetermined set-point value.

According to a preferred embodiment of the invention, a temperature sensor, measuring the temperature in the neighborhood of the discharge opening, as well as an automatic controller, fed with the temperature measurement value, are provided for an indirect viscosity measurement for controlling the Peltier elements according to the size of the deviation from a predetermined temperature set-point value.

Since the tempering apparatus is employed in particular in connection with varnishing and gluing robots, by way of which varnishes or, respectively, glues are applied with the aid of suitable injection or spray nozzles onto a workpiece surface, there has proven to be particularly advantageous to control the viscosity of the mass sprayed on by a surveillance of the generated injection image or spray image. As in the case of glues, also in the case of varnishes, already in case of small temperature deviations from the set-point, the viscosity becomes substantially changed and interferes, in case of a non-optimum setting, the sprayability of the mass and thus the spray image. This becomes clear, for example, in a change of the spray width and of the spray thickness, or in a tearing or bursting of the material. According to a preferred embodiment of the invention, therefore, a sensor is disposed in the neighborhood of the injection or spray nozzle or an image recognition apparatus for measuring of the spray image of the mass applied to the workpiece. Furthermore, an automatic controller, fed with the measurement parameters of the spray image, is provided for controlling the Peltier elements according to the deviation from the predetermined set-point parameters. For example, the spray-beam width or spray-beam thickness can be employed as measurement parameters of the spray image.

According to a further preferred embodiment of the invention, the heat-exchange body is formed as a metal block, for example, made of aluminum or copper, in the shape of a flat cuboid, where the broad-side faces of the cuboid are covered with, in each case, a combined heating and cooling aggregate formed of Peltier elements, and wherein the boreholes forming the flow channel are disposed in a plane located parallel to the broad-side faces. Advantageously, the boreholes are accessible via closable openings from the outside, such that a simple cleaning of the boreholes becomes possible.

Helically wound guide faces in sections with alternatingly clockwise and counter-clockwise direction are disposed in the flow channel, the sections being staggered against each other in circumferential direction at their transition locations, for improving the mixing of the mass flow in the flow channel for the purpose of a better temperature balancing. The guide faces subdivide the flow channel into two part-channels joining each other, in each case, pairwise at the transition points. These guide faces can be exchanged easily via the closable openings for maintenance and cleaning purposes.

The tempering apparatus according to the invention weighs, in case of the use of an aluminum cuboid as a heat-exchange body, less than 20 kg, and can consequently be disposed immediately at a robot arm.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention:

FIG. 7 a block-circuit diagram of a control circuit for the tempering apparatus.

DESCRIPTION OF INVENTION AND PREFERRED EMBODIMENT

Figure 1:
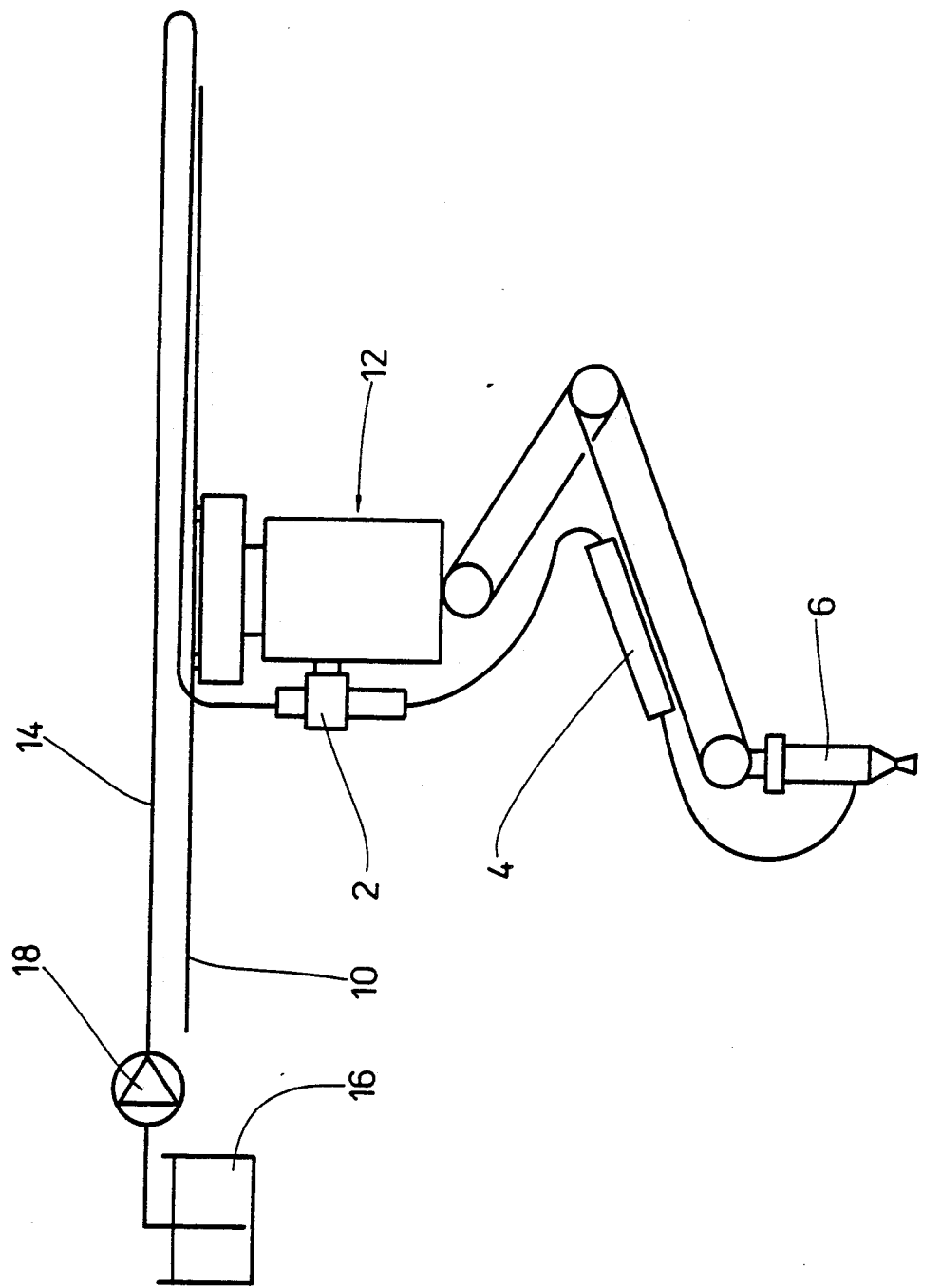
FIG. 1 a view of a robot construction for the glue application onto workpiece surfaces.
Figure 2:
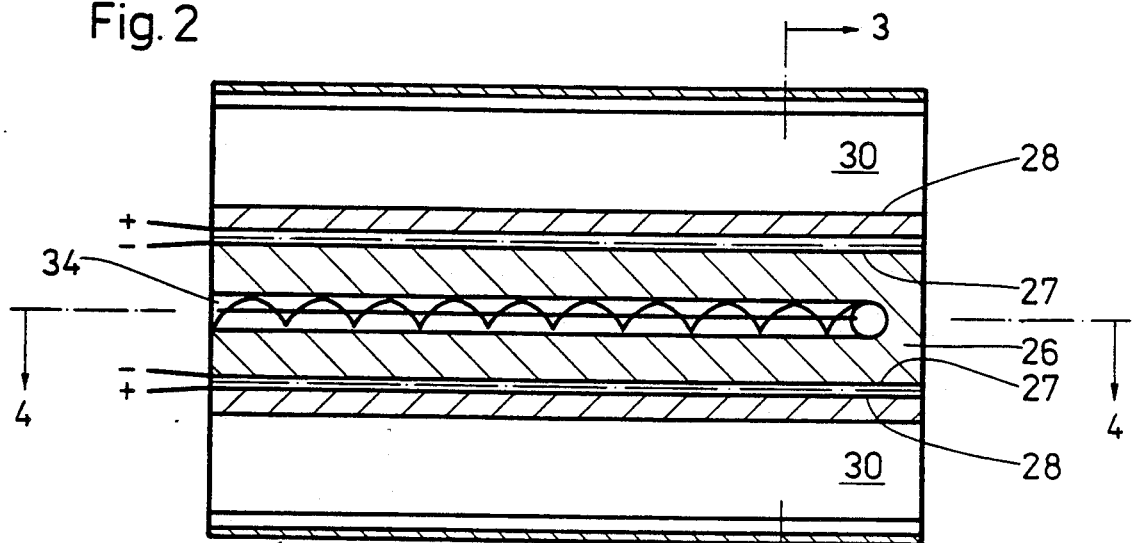
FIG. 2 a vertical section through the tempering apparatus of the robot construction according to FIG. 1.
Figure 3:
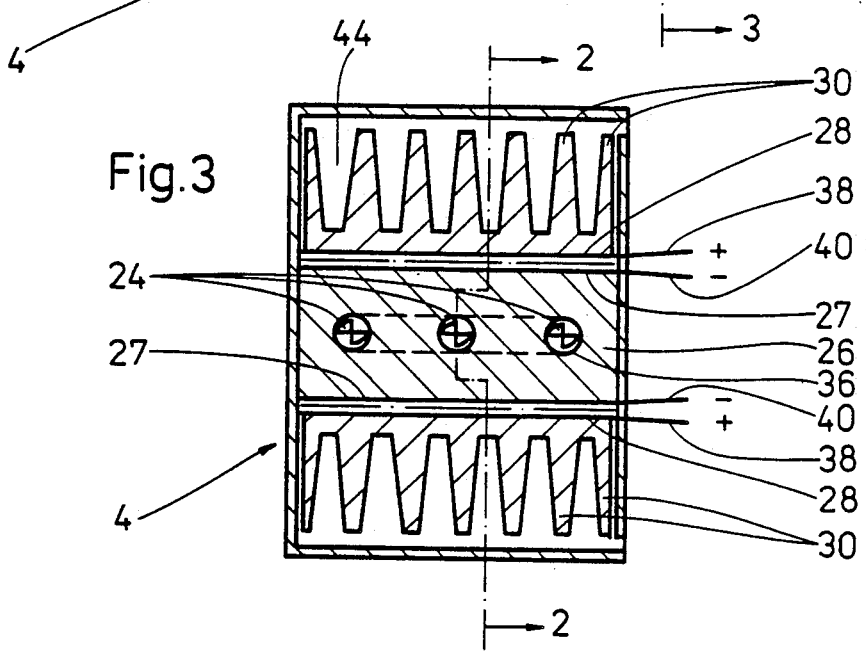
FIG. 3 a section along the section-line III—III of FIG. 2.
Figure 4:
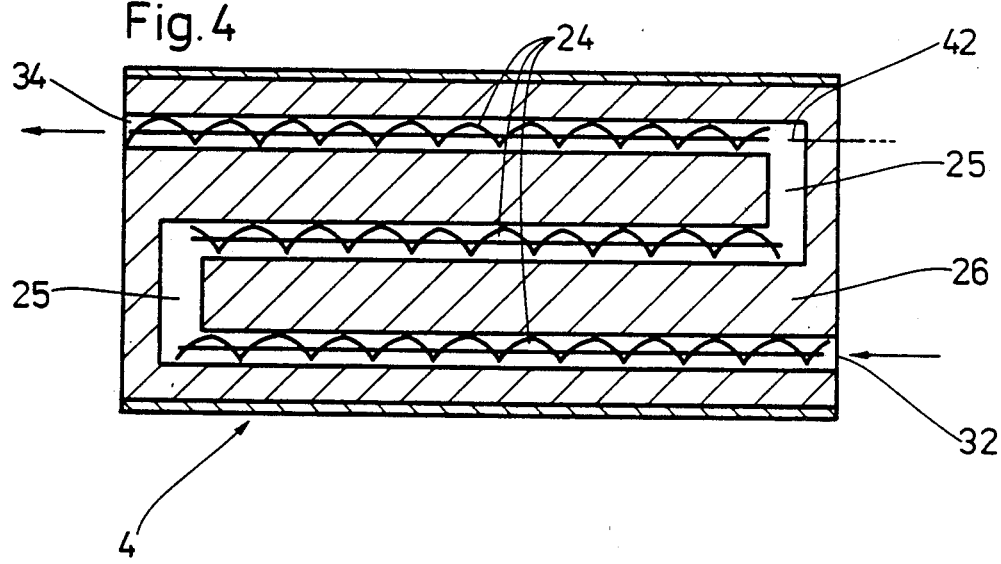
FIG. 4 a section along the section line IV—IV of FIG. 2.

The robot construction according to FIG. 1 includes an industrial robot 12, which is hangingly movable along a support rail 10. The industrial robot is connected via a power supply chain with electric lines, pneumatic lines, and glue pipes 14. The glue is transported from a storage container 16, with the aid of a conveyor pump 18 through the glue high-pressure line 14, under a pressure of about 250 bar, to the aggregates 2, 4, 6 disposed at the robot 12. There, the glue passes initially into a constant-pressure generator 2 and, from there, via a glue tempering apparatus 4 into a controllable glue gun 6. While the high-pressure line 14, fed to the robot from the stationary conveyor pump 18, is about 10 to 15 m long, the distance between the aggregates, disposed on the robot, amount overall to only about 1 m. The arrangement of the glue tempering apparatus 4 immediately on the robot 12 is only made possible by the light-weight construction described in the following.

The tempering apparatus 4 substantially comprises a cuboid or parallelepipedal metal block 26, made of aluminum and furnished with longitudinal boreholes 24, as well as Peltier elements 28, disposed on the broad-side faces 27 of the metal block 26. The Peltier elements 28 are furnished with heat guide ribs 30 on their heat-exchange face disposed opposite to the metal block 26. The longitudinal boreholes 24 are disposed in a plane located parallel to the broad-side faces 27 within the metal block 26. The longitudinal boreholes 24 are connected to each other by way of cross boreholes 25 to a meander-shaped flow channel, which meander-shaped flow channel exhibits, at the one front face of the metal block 26, an input opening 32 connected to the constant-pressure generator 2 and, at the second front face, a discharge opening 34 running to the glue gun 6. Static mixers 36 formed as sheetmetal guides or guide ribs, are disposed inside the channel 24, 25, which sheetmetal guides or guide ribs effect a mixing of the flowing glue and thus a temperature balancing within the glue.

The Peltier elements 28 can be employed, depending on polarity of their connection terminals 38, 40, for cooling or for heating of the metal block 26. Furthermore, an automatic controller is provided, which is not illustrated in the drawing, which is fed with a temperature measurement value captured by a temperature sensor 42 disposed in a channel 24, 25, and which controls the Peltier elements 28 depending on the deviation of the temperature measurement value from a predetermined temperature set-point value.

The thermal guide ribs 30 of the Peltier elements 28 are positively pressurized by a flowing heat carrier. The thermal guide ribs 30 are disposed for this purpose, for example, in an air channel 44, which air channel is fed with air as a heat carrier by way of a blower, not illustrated here.

Figure 5:
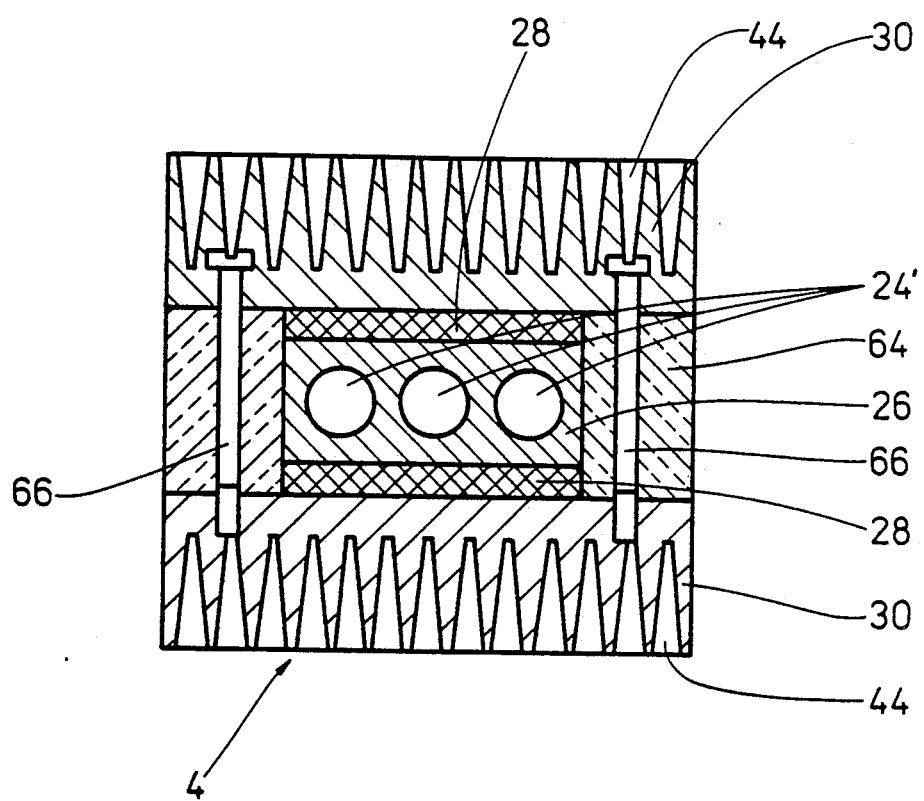
FIGS. 5 and 6 a modified embodiment of a tempering apparatus in sectional views according to FIGS. 3 and 4.
Figure 6:
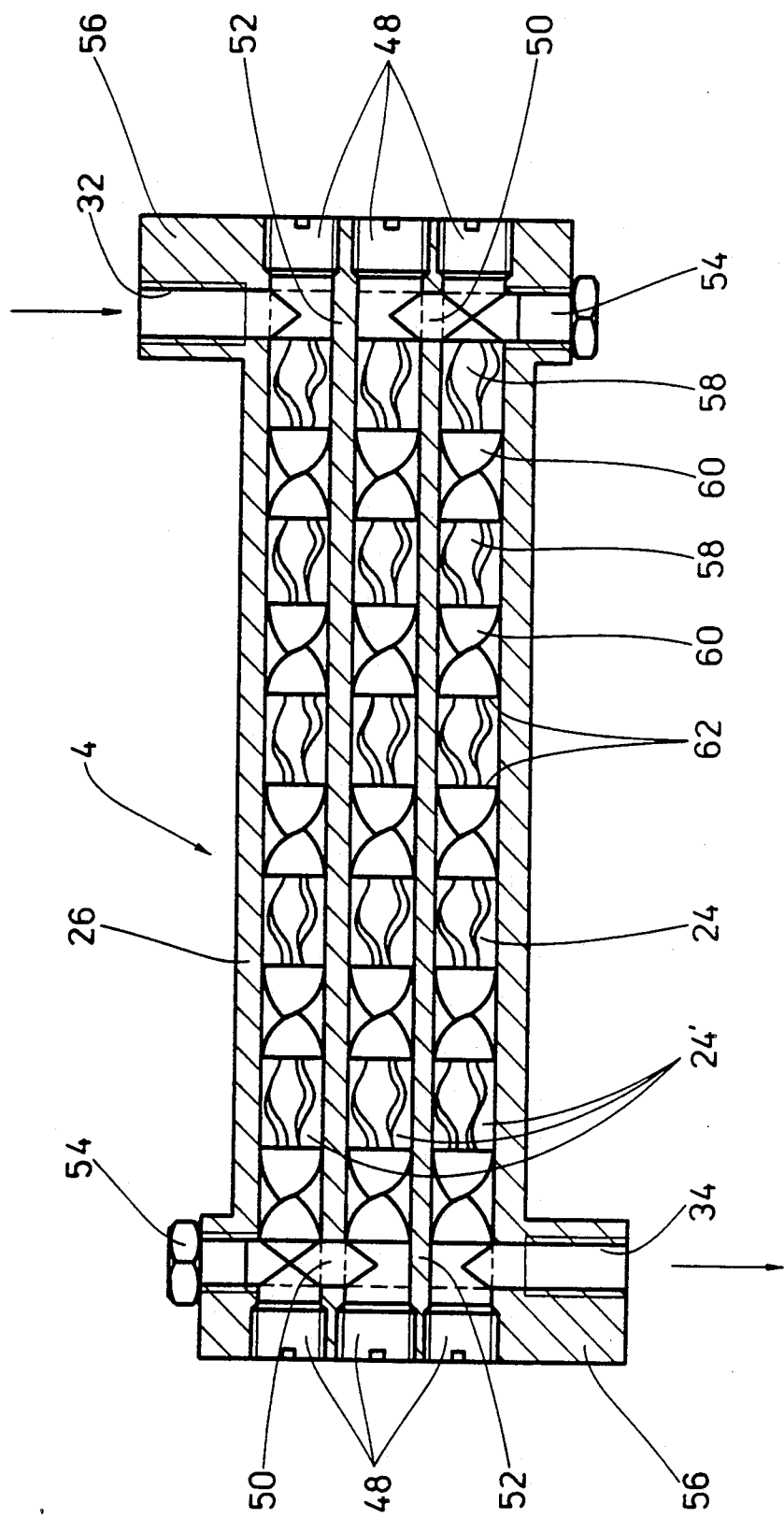

According to a preferred embodiment of the tempering apparatus according to FIGS. 5 and 6, the cuboid or parallelepipedal metal block 26 is furnished with three longitudinal boreholes 24', which are accessible from the outside at their ends by screw-type plugs 48. Holes are cut into the ends of these boreholes from the longitudinal sides such that the one separating wall is separated under formation of a cross connection 50 between the two neighboring boreholes 24', while the other separating wall 52 remains intact. The connection boreholes 50 are closed, in each case, by one screw plug 54, while connection pieces 56, with input and output openings 32 and 34, are disposed on the oppositely disposed side.

In order to obtain a larger volume, it is also possible to furnish more, for example seven, longitudinal boreholes 24'. In this case, through-connection boreholes 50 are furnished, which cut into all longitudinal boreholes 24', while the separating walls 52 are formed by separating bolts (not illustrated) inserted into the connection boreholes.

The guide faces 36, disposed in the longitudinal boreholes 24', exhibit screw-shaped wound sections 58, 60, which screw-shaped wound sections 58, 60 are disposed alternatingly clockwise and counter-clockwise and which are staggered against each other in circumferential direction at the transition points 62. The guide faces 36 subdivide the glue boreholes 24' in two part channels, flowing, in each case, pairwise half into each other, at the transition points 62, and thus furnishing an intensive mixing of the flowing glue, such that despite poor thermal conductivity of the glue material, there is obtained a constant temperature over the cross-section of the glue channel heated or cooled from the outside by the Peltier element.

The ribbed aluminum bodies 30 are disengageably clamped with tensioning screws 66 under intermediate clamping of the Peltier elements 28, at the metal block 26. A heat-conductive paste, disposed at the heat-exchange faces between the metal block and the Peltier element or, respectivelY, the Peltier element and the cooling body, takes care of a good thermal contact. Thermal insulations 64, comprising polyurethane foam, are disposed at the narrow-side faces of the metal block 26 not covered with Peltier elements.

The automatic control circuit, illustrated in FIG. 7 by way of a block-circuit diagram, comprises in addition to the tempering apparatus 4 and the spray gun 6, furnished with a spray nozzle 70, also a charge-coupled device image sensor 72 (CCD=charge-coupled device), with which charge-coupled device image sensor the spray image of the mass 76, applied to a workpiece surface 74 by the spray gun 6, is captured and measured. For example, the spray width and the spray thickness can be considered as measuring parameters, which are a measure for the viscosity of the applied mass 76. If the image changes based on viscosity changes which, for example, can result from tolerances in the composition or on different starting materials, then the image-capturing apparatus 72 and the intermediately connected automatic controller 78, integrated for example in the robot control, automatically controls, via an analog output signal, the current supply of the Peltier elements in the tempering apparatus 4. The tempering control thus is automatically controlled in order to obtain a uniform spray result.

It will be understood that each of the elements described above, or two or more together, may also find a useful application in other types of tempering apparatus differing from the types described above.

While the invention has been illustrated and described as embodied in the context of an apparatus for tempering fluid masses, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Tempering apparatus for fluids with a heat-exchange body of high thermal conductivity exhibiting a parallelepipedal solid body (26), wherein at least one broad-side face of the heat-exchange body is thermally connected with Peltier elements (28) and with boreholes disposed in the heat-exchange body, which boreholes are connected to a meander-shaped flow channel (24, 25) with an input opening (32) and a discharge opening (34), wherein the flow channel comprises means for feeding it with high-viscosity masses as fluids, and wherein the Peltier elements (28) are formed as combined heating and cooling aggregates, depending on the polarity of their connection terminals, and wherein a sensor is provided for measuring the viscosity of the mass flow exiting from the tempering apparatus, as well as with an automatic controller fed with the respective measurement value for controlling the Peltier elements (28), depending on the deviation from a predetermined set-point value.

2. Tempering apparatus according to claim 1, wherein the high-viscosity masses are glues.

3. Tempering apparatus according to claim 1, wherein the high-viscosity masses are sealing and jointing material.

4. Tempering apparatus according to claim 1, wherein the high-viscosity masses are lacquers and varnishes.

5. A tempering apparatus for flowable masses
   including a heat-exchange body of high thermal conductivity exhibiting a parallelepipedal solid body (26);
   at least one broad-side face of the heat-exchange body is thermally connected with Peltier elements (28) and with boreholes disposed in the heat-exchange body;
   wherein the boreholes are connected to a meander-shaped flow channel (24, 25) with an input opening (32) and a discharge opening (34);
   wherein the flow channel comprises means for feeding it with high viscosity masses as fluids;
   wherein the Peltier elements (28) are formed as combined heating and cooling aggregates, depending on the polarity of their connection terminals;
   a sensor for measuring a value depending on the viscosity of the mass flow exiting from the tempering apparatus;
   an automatic controller which is fed with the respective measurement value for controlling the Peltier elements (28), depending on the deviation from a predetermined set-point value.

6. Tempering apparatus according to claim 5, wherein a temperature sensor (42), measuring the temperature in the neighborhood of the outlet opening (34) of the flow channel (24, 25), as well as an automatic controller, fed with the temperature values, is provided for controlling the Peltier elements (28) depending on the deviation from a predetermined temperature set-point value.

7. Tempering apparatus according to claim 5, wherein the apparatus comprises an injection spray nozzle for applying the mass flow exiting from said discharge opening onto a workpiece surface, wherein a sensor, for measuring the spray image of the mass applied to the workpiece, is disposed near by the injection spray nozzle, and wherein said automatic controller, feedable with the measurement parameters of the spray image, is provided for controlling the Peltier elements (28) depending on the deviation from predetermined image parameters.

8. Tempering apparatus according to claim 7 further comprising
   means for determining a spray beam width or spray beam thickness, wherein the spray-beam width or the spray-beam thickness is employed as measurement or, respectively, image parameter.

9. Tempering apparatus according to claim 7, wherein the sensor exhibits a charge-coupled device image sensor as well as a circuit for evaluating the charge-coupled device image.

10. Tempering apparatus according to claim 5, wherein helically wound guide faces (36) in sections with alternating clockwise and counter-clockwise running direction are disposed in the flow channel (24, 25), which sections are staggered against each other in circumferential direction at their transition locations and which guide faces subdivide the flow channel into two part-channels which at the transition locations, in each case, are pairwise half joining each other.

11. Tempering apparatus according to claim 10, wherein the guide faces comprise a sheetmetal part wound in sections in a clockwise and counter-clockwise direction.

12. Tempering apparatus according to claim 10, wherein the guide faces (36) exhibit a surface which cannot be wetted by the highly viscous mass.

13. Tempering apparatus according to claim 10, wherein the guide faces comprise a plastic injection-molded part wound in sections in a clockwise and counter-clockwise direction.

14. Tempering apparatus according claim 5, wherein the individual boreholes (24) of the flow channel are accessible from the outside via closable openings (48).

15. Tempering apparatus according to claim 5, wherein the boreholes (24') are pairwise connected to each other in the region of their front-face ends by connection boreholes (50) and intermediate walls (52) under formation of said meander-shaped flow channel.

16. Tempering apparatus according to claim 15, wherein the connection boreholes (50) at the two front faces cut into all channel boreholes (24') and wherein the intermediate walls (52) are formed by separating bolts inserted into the connection boreholes (50).

17. Tempering apparatus according to claim 5, wherein the heat-exchange body is formed as a metal block (26) made preferably of aluminum.

18. Tempering apparatus according to claim 17, wherein the heat-exchange body (26) exhibits the shape of a flat cuboid, where broad-side faces (27) of the cuboid are covered with a combined heating and cooling aggregate comprising, in each case, Peltier elements (28), and wherein the boreholes (24, 25), forming the flow channel, are disposed in a plane running parallel to the faces (27).

19. Tempering apparatus according to claim 18, wherein the input opening (32) and the discharge opening (34) are disposed at narrow-side walls of the heat-exchange body (26) disposed opposite to each other.

20. Tempering apparatus according to claim 5, wherein the Peltier elements (28) are provided at their heat-exchange face, disposed opposite to the heat-exchange body (26), with heatguide ribs (30).

21. Tempering apparatus according to claim 5, wherein a gaseous heat carrier is positively admitted to the Peltier elements (28) at their heat-exchange face (30), disposed opposite to the heat-exchange body (26).

22. Tempering apparatus according to claim 21, wherein the heat-exchange faces (30) of the Peltier elements (28), disposed opposite to the heat-exchange body (26), are disposed in an air channel (44) with a blower.

23. Tempering apparatus according to claim 5, wherein at least one part of the Peltier-element-free front-side faces of the heat-exchange body is thermally insulated toward the outside by a heat-insulating material, made of a polyurethane foam.

24. Tempering apparatus according to claim 5, wherein the solid body (26) exhibits a cuboid shape.

25. Tempering apparatus according to claim 5, wherein the apparatus comprises an injection spray nozzle for applying the mass flow exiting from said discharge opening onto a workpiece surface, wherein an image-recognition apparatus, for measuring the spray image of the mass applied to the workpiece, is disposed near by the injection spray nozzle, and wherein said automatic controller, feedable with the measurement parameters of the spray image, is provided for controlling the Peltier elements (28) depending on the deviation from predetermined image parameters.

26. Tempering apparatus according to claim 5, wherein the heat-exchange body is formed as a metal block (26) made preferably of copper.

27. Tempering apparatus according to claim 5, wherein a liquid heat carrier is positively admitted to the Peltier elements (28) at their heat-exchange face (30), disposed opposite to the heat-exchange body (26).

28. Tempering apparatus according to claim 5, wherein the high-viscosity masses are glues.

29. Tempering apparatus according to claim 5, wherein the high-viscosity masses are sealing and jointing material.

30. Tempering apparatus according to claim 5, wherein the high-viscosity masses are lacquers and varnishes.

* * * * *